United States Patent [19]

Booth

[11] 3,827,022

[45] July 30, 1974

[54] INDUCED DOPPLER SONAR

[75] Inventor: Newell O. Booth, San Diego, Calif.

[73] Assignee: The United States of America as represented by the Secretary of the Navy, Washington, D.C.

[22] Filed: Apr. 23, 1973

[21] Appl. No.: 353,263

[52] U.S. Cl. .................. 340/3 R, 340/3 D, 340/6 R

[51] Int. Cl. ........................... G01s 3/80, G01s 7/52

[58] Field of Search ........... 340/1 R, 3 R, 3 D, 6 R, 340/16 R; 343/113 DE

[56] References Cited

UNITED STATES PATENTS

| | | | |
|---|---|---|---|
| 2,405,281 | 8/1946 | Bemis | 340/16 R |
| 3,113,286 | 12/1963 | Miller et al. | 340/6 R |
| 3,144,646 | 8/1964 | Breithaupt | 343/113 DE |
| 3,657,693 | 4/1972 | Graham et al. | 340/6 R |

*Primary Examiner*—Richard A. Farley
*Attorney, Agent, or Firm*—Richard S. Sciascia; Ervin F. Johnson; William T. Skeer

[57] ABSTRACT

An object bearing detection system comprises a broad-band transmitting electroacoustic transducer and a similar broad-band receiving electroacoustic transducer. The two electroacoustic transducers are combined in an active ranging system such that the transducer is responsible to echo returns from signals produced by the transmitting transducer. The electrical output from the receiving transducer is processed by a plurality of narrow-band filters to obtain bearing information from the returned signals as a function of the Doppler shift of the signals.

7 Claims, 7 Drawing Figures

INDUCED DOPPLER SONAR

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the electronics arts. More particularly, this invention pertains to object bearing detection. In still greater particularity, this invention pertains to object bearing detection by means of electroacoustic ranging. By way of further characterization, this invention will be described as it pertains to the field of active sonar object detection.

DESCRIPTION OF THE PRIOR ART

Conventional sonar techniques and current state of the art systems employing these techniques measure object bearings by determining an amplitude and phase relationship of a reflected signal from a target as a function of the position within the aperture. This aperture corresponds to the physical dimensions of the particular electroacoustic transducer employed by the sonar system. The sonar signals are processed in a variety of ways to construct a distribution of reflected energy in the target plane from which the bearing data may be obtained. The angular resolution of objects in the prior art systems is a measure of the angular separation between points which are distinguishable as to objects in the particular reflected energy distribution construction. This angular resolution is one well-understood measure of the quality of a given sonar system. In general, the angular resolution is limited by the frequency of the acoustic energy and the dimensions of the transducer aperture of the system.

Because of these well understood prior art limitations, high resolution sonars have employed transducers which are physically quite large. Such large transducers are costly to manufacture, and in many situations, create hydrodynamic drag on the vessels employing them. For example, a frequently encountered technique is to employ an elongated linear array of individual transducers which are phased by appropriate delay-line coupling networks to provide a unitary construction.

SUMMARY OF THE INVENTION

The invention provides an object bearing detection system in which the transducers are mechanically scanned over a relatively large aperture during the time ranging signals are transmitted and received. The received signal is processed through a plurality of relatively narrow-bandpass channels. The output of each of these channels is sequentially scanned to provide an indication of the bearing of the object from which the target returns emanated. In some applications, the mechanical scanning of the transducer may be accomplished by the movement of the vehicle on which the system is mounted. Where additional scanning speed is desired, a separate mechanical scanning system may be employed to impart additional velocity to the transducer system. Since the transducer mechanism of the invention is relatively small, the vehicles employing the invention are not encumbered with large-dimension transducers while retaining the accuracy of angular resolution present in the large transducer systems.

STATEMENT OF THE OBJECTS OF THE INVENTION

It is accordingly an object of this invention to provide an improved object bearing detection system.

A further object of this invention is to provide an object bearing detection system having a high angular resolution.

Another object of this invention is to provide an object bearing detection system having a large transducer aperture obtained with a transducer having small physical dimensions.

A further object of this invention is the provision of an echo bearing-detection system employing Doppler signal processing.

Another object of this invention is the provision of an echo bearing-detection system having high angular resolution and a transducer aperture having small physical dimensions.

Still another object of this invention is the provision of a high-resolution bearing-detection system employing Doppler processing circuitry which is controlled by the speed of the vehicle on which the system is mounted.

Other objects, advantages, and novel features of the invention will become apparent from the following detailed description of the invention, when considered in conjunction with the accompanying drawings wherein:

DESCRIPTION OF THE PREFERRED EMBODIMENT

Figure 1:
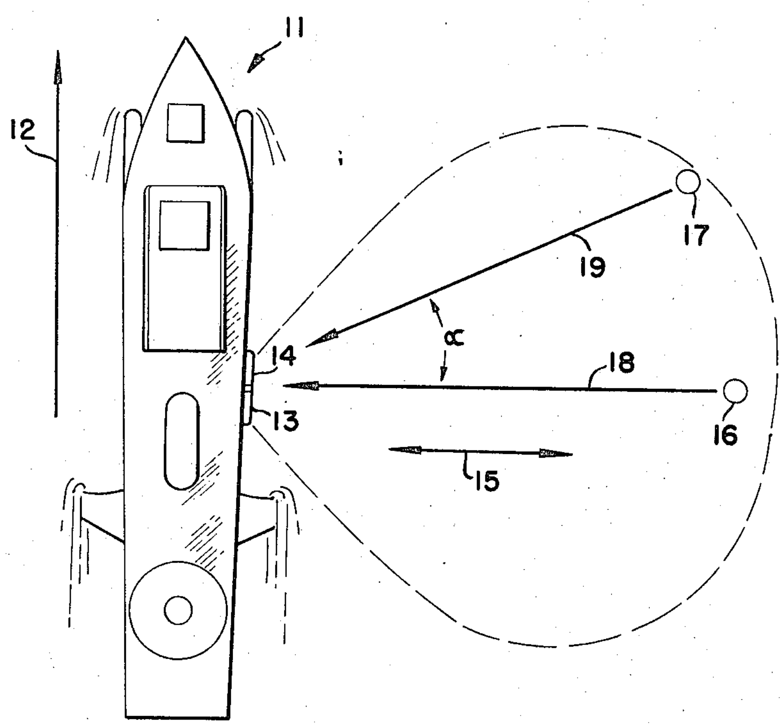
FIG. 1 is a plan view of a hydrofoil surface ship employing the system of the invention.

Referring to FIG. 1, a hydrofoil craft 11 is illustrated as a platform for the system of the invention. As shown, hydrofoil craft 11 is moving along a direction indicated by a vector 12. The transmitting trasducer 13 and a receiving transducer 14 are carried by hydrofoil 11.

For purposes of illustration and simplicity, transducers 13 and 14 are shown mounted on the hull of hydrofoil craft 11. Of course, the precise physical location of the transducers may vary from that shown. In particular, transducers 13 and 14 are carried in such a position as to be wetted when hydrofoil craft 11 is being "flown" on the supporting hydrofoil structure. Thus, transmitting transducer 13 and receiving transducer 14 may be mounted upon the struts or booms in the vicinity of the hydrofoil surfaces themselves or, alternatively, may be mounted on a separate boom which extends downwardly from the hull or hydrofoil craft 11 so as to be wetted regardless of the attitude of hydrofoil 11.

Transmitting transducer 13 and receiving transducer 14 may be of any configuration which has a broad band of frequency response as well as a broad and nondirectional radiation and sensitivity field. As an example of one construction of a transducer arrangement having the desired properties, of small physical dimensions permitting localized mounting attention is invited to the U.S. Pat. No. 3,569,921 issued on Mar. 9, 1971 to Willis A. Teel for "Cylinder Rod Dual Resonant Transducer Array."

Transducers 13 and 14 ensonify and receive signals, respectively, from an area which extends outwardly from hydrofoil craft 11 in a direction generally indicated by a double headed arrow 15. Thus, it may be seen that objects 16 and 17 may be impinged by the ensonifying energy and reflect signals from and to transducers 13 and 14. A symmetrical field about transducers 13 and 14 which would include objects 16 and 17 is illustrated in FIG. 1 by a broken line pattern. Such a pattern is only exemplary and is greatly simplified for purposes of illustration. In practice, the field would advantageously be considerably broader than that shown. However, even the narrow-field example shown will respond to echo returns from object 17 which lies considerably forward of object 16, directly athwart hydrofoil vessel. This is an important advantage of the system of the invention over conventional side-looking sonars, which have no forward capabilites. The energy paths between objects 16 and 17 and receiving transducer 14 are indicated by arrows 18 and 19 which, as shown, have an included angle $\alpha$ therebetween.

This will be understood by those familiar with the electronic echo ranging arts, a signal returned from object 16 which is located at right angles to the direction of motion of hydrofoil craft 11 will undergo no frequency change as a result of that motion. However, a signal returned from a target 17 will be shifted in frequency by the well understood Doppler effect. The amount of this shift is given by the formula:

$$\Delta f = (2V/C)\, f \text{ sine } \alpha. \quad (1)$$

where:

$f$ is the frequency of the ensonifying energy;

V is the velocity of hydrofoil craft 11;

C is the velocity of the ensonifying energy;

and $\alpha$ is the angle of target 17 from the direction perpendicular to the motion of hydrofoil craft 11.

Present state of the art techniques in data processing makes it possible to measure these changes of frequencies over small ranges and to solve the equation for $\alpha$ thereby obtaining the bearing angle of the target 17. As will be recognized by those familiar with the art, the above formulation is a simplification for cases where the propagating medium, in the illustrated example sea water, is homogeneous over ranges of interest such that the propagating velocity, C, remains a constant.

As may be readily seen, the resolution of the reduced Doppler system depends upon the accuracy with which the echo frequency may be measured. For angles where $\alpha$ is much less than one radian, the error in the angle measurement for a given error in frequency measurement, $\delta f$, is given by:

$$\Delta\alpha = (C/2V)\,(\delta f/f). \quad (2)$$

In general, a signal processor for this type of arrangement will include a plurality of narrow-band channels and these channels together will provide an angle of view, $\beta$, given by the equation:

$$\beta = (2n + 1)\,\Delta\alpha \quad (3)$$

Where:

$\beta$ is the field of view of the system;

and $n$ is an integer.

The frequency to which the individual channels are tuned is given by the formula:

$$f_k = f(1+k[2V/C]\Delta\alpha) \quad (4)$$

Where:

$f_k$ is the center tuned frequency of the $k$th channel;

and $k$ is an integer between $-n$ and $n$.

From the above mathematical considerations, it may be seen that small angular resolution of the bearing detection system of the invention is dependent upon having a velocity of movement relatively high to induce a maximum Doppler change in reflected signals. For vehicles having a higher velocity, such as hydrofoil 11, direct placement of transducer arrangement on the vehicle in a fixed position in relation thereto will produce satisfactory results.

The advantages offered by the system of the invention would be very desirable in some slower moving craft. Fortunately, it is possible to obtain adequate transducer velocity by employing a variety of special mountings. These mountings are designed such that the transducer arrangement may be given a velocity which is independent from that of the vehicle on which the transducer is mounted.

Figure 2:
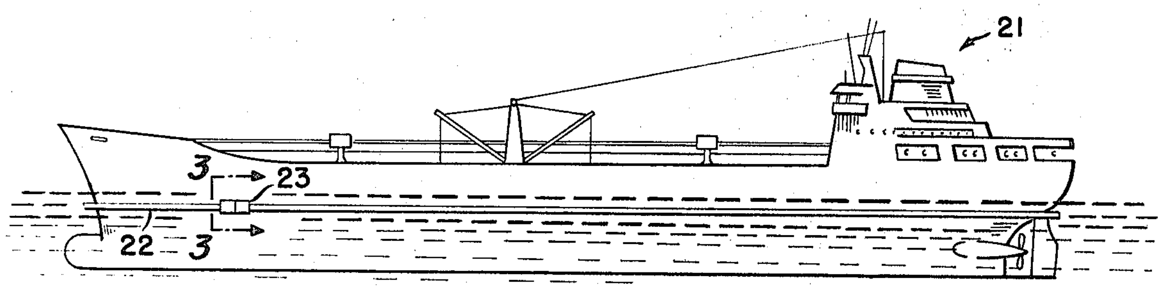
FIG. 2 is a side elevation view of the system of the invention employed on a relatively slow surface vessel.

Referring to FIG. 2, one possible arrangement for accomplishing this desirable result is shown. A large surface vessel, such as tanker 21, is shown as having a closed rail 22 encircling its hull. Of course, rail 22 is located below the water line of tanker 21 and provides a guidance and support arrangement for the movement of a transducer carriage 23. Transducer carriage 23 carries the energizing and receiving transducer in an operational arrangement similar to the fixed arrangement illustrated in FIG. 1. Transducer carriage 23 may be a trolley-like device which is driven about rail 22 with a velocity which is independent of the motion of tanker 21.

Figure 3:
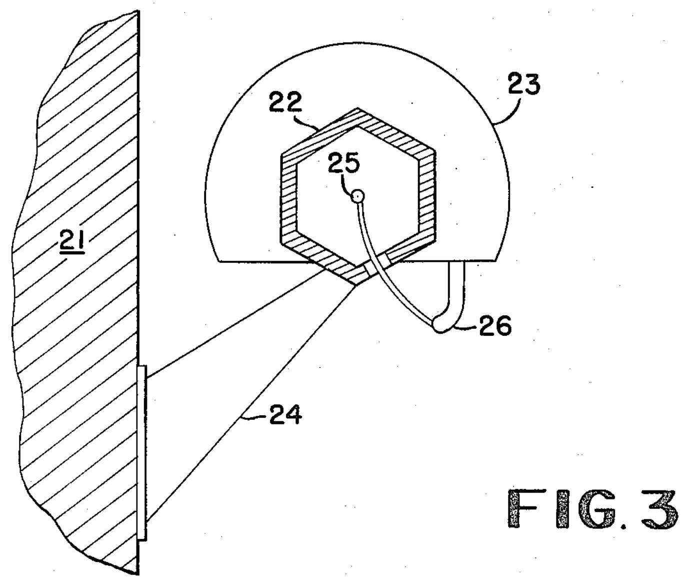
FIG. 3 is a sectional view taken along lines 3—3 of FIG. 2.

Referring to FIG. 3 which is a section of view of the transducer mounting taken along lines 3—3 of FIG. 2, it may be seen that rail 22 is attached to tanker 21 by means of support 24 and that transducer carrier 23 fits on rail 22 such as to engage in the rail which, as illustrated, may be of hexagonal cross section.

Any suitable guide means may be provided for transducer carrier 23 including internally mounted motor arrangements. However, in the illustrated arrangement a trolley-like propulsion system is provided by means of a flexible cable 25 carried within interior of rail 22 which is connected to transducer carriage 23 by means of a suitable linkage 26. This arrangement has some advantages in that a plurality of transducer carriages 23 may be mounted on the rail 22 with a fixed spacing. Thus, a second carriage 23, not shown, may be moving up the starboard side of tanker 21 while the illustrated carrier 23 is moving on the port side.

Figure 4:
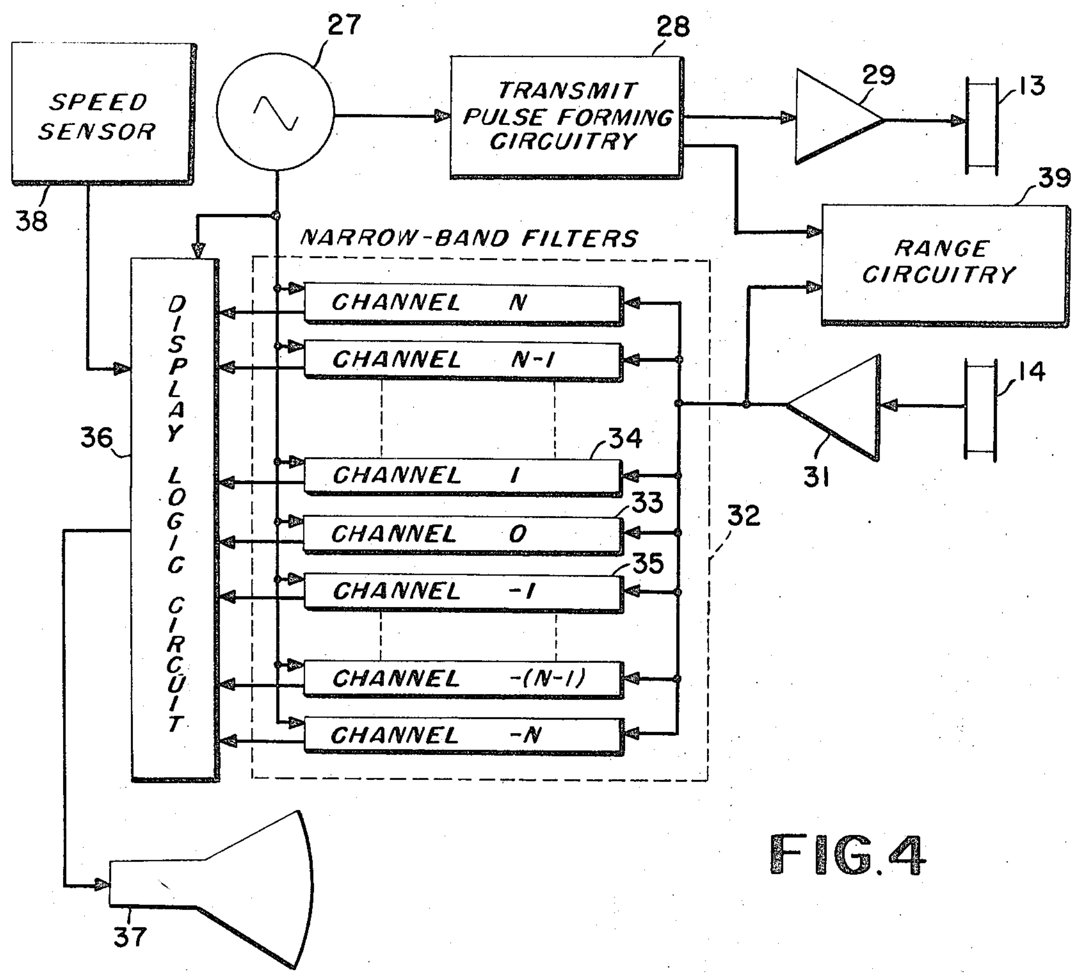
FIG. 4 is a diagrammatic showing of the circuit according to the invention.

Referring to FIG. 4, a diagrammatic showing of circuitry to implement the signal processing of the invention, a master oscillator 27 is connected to transmit pulse-forming circuitry 28. Master oscillator 27 may be any conventional master timer-programmer circuit commonly used in the electronic ranging arts. Likewise, transmit pulse-forming circuitry 28 is a conventional pulse-forming network and produces an output pulse at predetermined intervals and duration in response to the exertation provided by master oscillator 27. The individual pulses are shaped for energization of transducer 13, to which they are coupled via a power amplifier 29, and should have a length which is at least the reciprical of $\delta f$, as described above.

Echo returns are received, as previously explained, by receiving transducer 14 which produces electrical analogs in response thereto. The electrical analog outputs of receiving transducer 14 are amplified by a preamplifier 31 to which transducer 14 is electrically connected.

The output of preamplifier 31 is connected to a network of narrow-band filters each tuned to a different Doppler frequency as noted in the discussion of the theory of operation of the circuit, above. The precise number of narrow-band filters depends upon the desired angular resolution, also as noted above. For purposes of explanation, this plurality is denoted by the number $m$ and, as illustrated, a like number of filters are provided on either side of the center channel 0 to provide for up-Doppler and down-Doppler frequency shifts. Thus, channel 0 is denoted by filter 33 and filters 34 and 35 on either side thereof are numbered channel 1 and channel −1 to indicate a positive Doppler to be processed by channel 1 and a negative Doppler to be processed by channel −1. Of course, up-Doppler indicates that the target is located forward of the location of the receiving and transmitting transducers 13 and 14. The negative Doppler indicates the location of objects shaft the transducer locations.

Each of the channels integrate the signals falling within their pass-band over the duty cycle determined by master oscillator 27 and the transmit pulse forming circuitry 28. Such filter arrangements are well known in the art. For a further treatment of such filter arrangements, attention is invited to standard reference works such as "Electronic Circuit Design Handbook," edited by the editor of EEE Magazine, Tab Books, Blue Ridge Summit, Pa. 17214, 1971. Also, a more complete theoretical discussion of the filters may be found in an invited paper entitled "Linear Signal Processing and Ultrasonic Transversal Filters," by William D. Squire et al, published Nov. 1969 in *IEEE Transactions on Microwave Theory and Techniques*, Volume MTT–17, No. 11. The output of each signal channel is connected to the display logic circuit 36 which periodically scans the stored outputs.

These output signals are processed and fed to a visual indicator 37. Display logic circuit 36 is a conventional sampling circuit in the Doppler sonar arts. For example, that shown in U.S. Pat. No. 3,657,693 issued to Walton Graham on Apr. 15, 1972 for "Multibeam Scanned Planar Array," may be used if desired. The display logic circuit 36 periodically samples the stored output of each of the narrow-band filters comprising narrow-band filter network 32 in response to timing signals fed from master oscillator 27.

It should also be noted that master oscillator 27 is connected to each of the narrow band filters to provide a signal which clears the channel for the next listen duty cycle.

A speed sensing circuit 38, which may be a conventional speed monitoring system already a part of the instrumentation display system of the vehicle in which the system is mounted, is also connected to circuit 36. A wide variety of electronic ship speed measuring devices are known and any which produces an electrical analog of the velocity of the vessel are acceptable, with suitable adaptation, to use with the invention. That described as "Underwater Log System Y" in *Marine Engineering* by Roy L. Harrington, Editor, SNAME, 1971 at page 655 or "The Doppler Sonar Speed Log," loc cit, are both satisfactory examples which may be used. Speed sensing circuit 38 provides a signal corresponding to the velocity component of the vessel itself which, as previously noted, is a factor determining the angular resolution of the system. In response to high velocity signals display logic circuit 36 spreads the signals over a wider display sector than for signals indicating a lower velocity.

Figure 5:
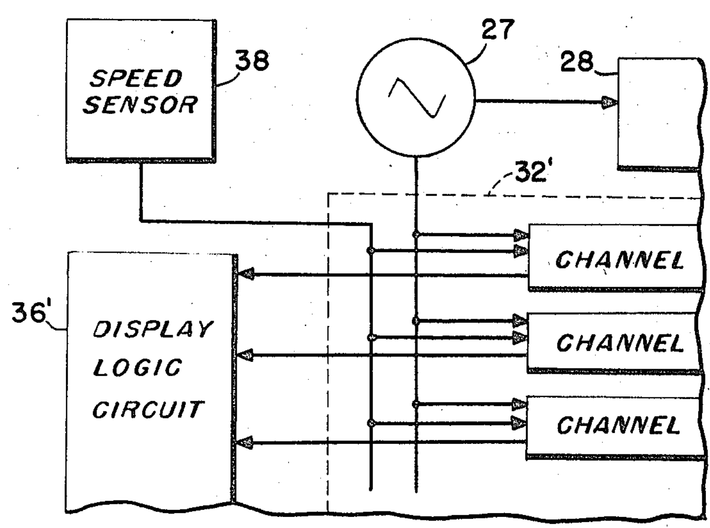
FIG. 5 is a partial diagrammatic showing of a modification of the circuit illustrated in FIG. 4.

Referring to FIG. 5, an alternate circuit arrangement is shown whereby the narrow band filter network 32 is comprised by a plurality of programmed filters which may be set in bandwidth in dependence on the output from speed sensor circuit 38 when said output is a digital format. In such a circuit, the displayed logic circuitry 36' would only scan the outputs of the individual channels and would not have to be programmed by the speed sensor as in the previously described circuit illustrated in FIG. 4. Such a circuit arrangement offers several advantages, particularly in instances where speed sensor circuit 38 may detect a complex motion of transducer velocity as may occur in particular mounting installations such as that to be described in connection with FIG. 7.

Figure 6:
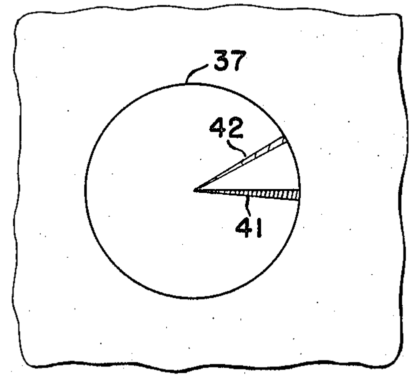
FIG. 6 is an illustration of one mode of display useful with the circuits illustrated at FIG. 4 and FIG. 5.

Referring to FIG. 6 a simplified display arrangement is shown in which a trace on a cathode ray is scanned over an angle corresponding to $\beta$ given in the explanation of the theory of operation of the circuit above. The cathode ray presentation is a standard visual indication type system and may, for example, be that shown in U.S. Pat. No. 3,701,089 issued on Oct. 24, 1972 to John G. Cowan for "Display for Multi-Channel Sonar." As each of the narrow band filters is scanned, an intensity modulated output would appear on a suitable readout, such as CRT 37 as a plurality of illuminated sectors. In the illustrated arrangement, sector 41 corresponds to the echo return from object 16 (FIG. 1) and sector 42 corresponds to the echo return from object 17, such that the included angle $\alpha$ represents the different heading to each of the two objects. And, the different in illumination intensity of the two sectors is indicative of the intensity of the target returned. In the illustrated example, the return from target 16 is shown as stronger than that from target 17. Of course, other display arrangements may suggest themselves to those versed in the art. However, since the circuitry required for such a display as illustrated in FIG. 6 is so well understood, it was chosen as exemplary of the type of display which may prove useful when employing the invention as a navigational instrument.

Figure 7:
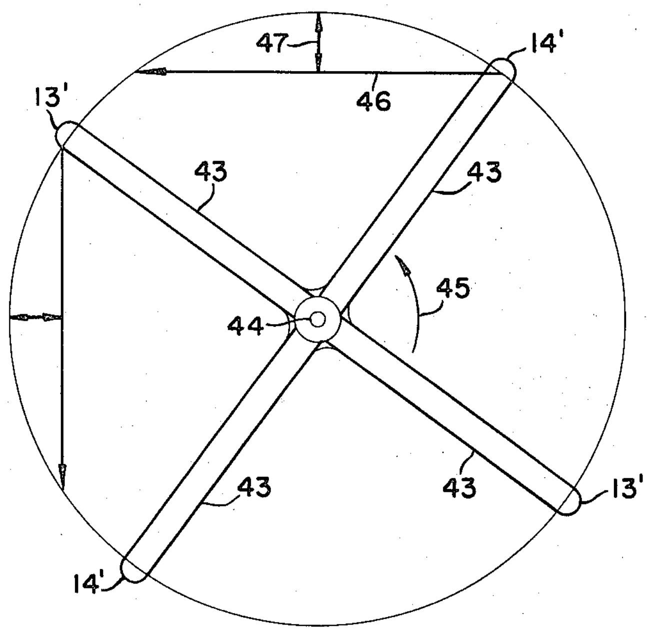
FIG. 7 is an illustration of an alternative mounting arrangement.

Referring to FIG. 7, an alternative mounting arrangement for the transducers is illustrated. In this arrangement, a scanning mechanism is made of four rotating arms 43, which are caused to rotate about a hub 44 in an orbital direction indicated by arrow 45. As shown, this arrangement permits two pairs of transducers 13' and 14' together with 13'' and 14'' to be contained in the same mounting installation.

In such an arrangement the transmitting transducers and the receiving transducers may be energized during a particular period of the rotation in which the transducer is moved across an aperture much as in the case of when transducers were mounted directly on a hydrofoil craft 11 or transducer carriage 23 carried on a slower moving vehicle. This movement is represented by the vector 46. The vector corresponds to the movement of the transducer across a cord of the circle traced by the rotation of these transducers on arms 43. Of course, a radial motion is also induced by this movement as represented by double headed arrow 47. However, since this motion is a recurring trigometric function of the rotational velocity of the arms 43, it may be compensated for by suitable circuitry as might be present in speed sensor circuit 38', reference to FIG. 5. In such an arrangement, each of the narrow band filter channels comprising the narrow band filter network 32' would be programmed in frequency response over each scanned cycle. This programming may be done by a circuit contained within speed sensor circuit 38', as previously discussed, or by independent circuit means independently connected to the filter network.

The foregoing description taken together with the appended claims constitutes a disclosure such as to enable a person skilled in the electronics and naval engineering arts and having the benefit of the teachings contained therein to make and use the invention. Further, the structure herein described meets the aforestated objects of the invention, and generally constitutes a meritorious advance in the art unobvious to such skilled persons not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. An echo bearing detection system for use on marine vessels comprising:

localized electroacoustic transducer means positioned on said marine vessel for energizing and receiving echo returns from objects lying in an extensive area in a predetermined direction with respect to said marine vessel;

mechanical scanning means attached to said electroacoustic transducer means and to an underwater portion of said marine vessel for movement of said transducer means along a path which is substantially at right angles to the predetermined direction;

Doppler signal processing circuitry electrically including a plurality of narrow band filters connected to said electroacoustic transducer means for processing the electrical output signals therefrom into a plurality of channels corresponding to increments of frequency deviation from the frequency of energization; and display means electrically connected to said Doppler signal processing circuitry for visually displaying the respective output signals from the plurality of channels as bearing indications relative to the predetermined direction.

2. An echo bearing detection system according to claim 1 in which said mechanical scanning means is configured to confine the aforesaid movement of said electroacoustic transducer means to define a closed path encircling said marine vessel.

3. An echo bearing system according to claim 2 in which said closed path is determined by a track extending about said underwater portion of the ship's hull.

4. An echo bearing detection system according to claim 3 in which said mechanical scanning means includes a motor driven platform mounted on said track for traversing the aforesaid closed path.

5. An echo bearing detection system according to claim 1 in which said narrow band filters are programmable filters.

6. An echo bearing detection system according to claim 1 further including a speed sensor circuit connected to the aforesaid display means for changing the bearing display in response to changes in the speed of movement of said transducer means.

7. An echo bearing detection system according to claim 5 in which said Doppler signal processing circuitry includes a speed sensor circuit connected to said programmable filters for adjusting the bandpass thereof in response to variations in the speed of movement of said transducer means.

* * * * *